United States Patent Office 3,775,360
Patented Nov. 27, 1973

3,775,360
GLOSSY EMULSION COATING COMPOSITIONS CONTAINING SURFACE TREATED PIGMENTS OF OILOPHILIC NATURE AND METHOD
Richard Glenn Smith, Chagrin Falls, Ohio, assignor to The Sherwin-Williams Company, Cleveland, Ohio
No Drawing. Continuation of application Ser. No. 574,-988, Mar. 30, 1956, which is a continuation-in-part of abandoned application Ser. No. 230,841, June 9, 1951, which in turn is a continuation-in-part of abandoned application Ser. No. 774,897, Sept. 18, 1947. This application Feb. 4, 1965, Ser. No. 430,468
Int. Cl. C09c 3/00; C09d 5/02
U.S. Cl. 260—24
11 Claims

ABSTRACT OF THE DISCLOSURE

The present invention involves the production of glossy emulsion coating compositions which are produced by treating the surface of pigments with materials which render it oilophilic.

---

The present application is a continuation of my copending application Ser. No. 574,988 filed Mar. 30, 1956, which was a continuation-in-part of application Ser. No. 230,841 filed June 9, 1951, now abandoned, which in turn was a continuation-in-part of my copending application Ser. No. 774,897 filed Sept. 18, 1947, now abandoned.

This invention relates to the manufacture of water reducible, glossy coating compositions, and to a method of manufacture which is an improvement over methods of production heretofore practiced.

Practical emulsion type finishes possess inherent advantages over conventional solvent reduced coatings. Thus, emulsion coatings can be reduced or thinned with water and consequently are free of solvent odors and are characterized by reduced fire hazards. The brushes and equipment used with such emulsions can be cleaned with soap and water. The application of the emulsions is both faster and easier, and penetration into porous surfaces is considerably less than with conventional formulas, which means fewer coats on new work. As a result, an amateur may use these coating compositions with excellent results.

The principal oil-in-water emulsion paints in present day use contain a plurality of pigments, not selective as to being either water or oil wetted and have their locus chiefly in the aqueous phase. These paints are not glossy, are not possessed of specular reflection, and are called "flat paints." Glossy emulsion paints are not unknown, but the quality of glossiness is not always permanent or stable and has been accomplished by the use of relatively expensive conventional procedures which entails conventional grinding operations and apparently excessive amounts of amine soaps which cause extremely slow drying of the paint films, and said slow drying has been a major objection to such glossy emulsion enamels.

One object of this invention is to produce a glossy emulsion type enamel with greater facility and speed, consequently, more economy of manufacture than hitherto possible with present practice.

Another object is to produce a glossy enamel without the requirement of a grinding operation necessary in conventional enamel manufacture.

Another object is to produce a glossy emulsion coating whose gloss will remain at a fixed level over an extended period of time.

Another object of the invention is to provide a method of incorporating pigments in elastomer emulsions to produce glossy films.

Still another objective is the use of pigments pulped in water in such fashion that the problem of water removal is overcome, and enamels can be made directly therefrom which will deposit glossy films. Other objects will appear hereinafter.

In accordance with this invention emulsion coating compositions are produced comprising essentially a discontinuous phase a pigment surface coated with an organic compound effective to render said pigment oilophilic, said organic compound being a monomeric organic compound characterized by at least one non-polar organic hydrophobic group containing at least 8 carbon atoms in a hydrocarbon structure, which group in the form of its monocarboxylic acid is soluble in oleoresinous varnishes and insoluble in water, and at least one polar group, said organic compound adhering to said pigment surface when said coated pigment is emulsified, and a continuous aqueous phase, said coating having been applied to said pigment prior to emulsification thereof, and said discontinuous pigmented phase being capable of forming a continuous solid glossy film when dried.

In the practice of the invention the emulsion coating compositions of the invention are prepared by incorporating a quantity of water with a pigment, surface altered to a preferentially oil wetted (oilophilic) state by treatment with the previously described polar organic compound, emulsifying the resultant surface treated oilophilic pigment with at least a part of the oil which is to form the discontinuous oil phase of the emulsion to produce a water-in-oil, pigment-in-oil emulsion, and converting said water-in-oil, pigment-in-oil emulsion to a pigment-in-oil, oil-in-water emulsion. The invention is primarily applicable to pigments of fine particle size, e.g., 0.2 to 0.5 micron, especially titanium dioxide which is normally hydrophilic in nature.

The present invention is based upon (1) the concept that sustained or stabilized gloss is produced by maintaining a coating of oil around the pigment particle, (2) the discovery that primary or initial dispersion of a pigment in water either before or after altering the surface character of the pigment to a more oilophilic state facilitates greatly the dispersion of the pigment-in-oil, and (3) the utilization in (2) of at least a part of the water necessary as a component part of the final pigment-in-oil, oil-in-water emulsion.

Initially to disperse a pigment in water that one desires to be dispersed in oil is a novel concept which would not be done deliberately to bring a pigment into an oil phase because of the well-known fact that oil and water do not mix. Apparently, however, the water penetrates between the agglomerated particles of pigment and leaves a water boundary between adjacent particles which allows admittance of oil droplets within the intersticial space to spread and to wet completely the individual oilophilic pigment particles. It is preferred that the pigment be water wetted after the surface has been rendered oilophilic but the surface alteration may be accomplished before or after the water treatment, depending upon the method used to surface coat the pigment. It is important, however, to add the oil binder phase subsequent to the alteration of the pigment surface to a more oilophilic character than normal except in the case of the oil being per se the treating agent and binder (as illustrated hereafter in Example 6) wherein a strongly polar oil is used as a substantial portion of the oil binder phase.

Pigment surface alteration to a more oilophilic nature prior to dispersion of the pigment in the oil is necessary to allow the water-in-oil, pigment-in-oil system to be processed so that the requisite phase changes. With the last phase change, the system becomes an emulsion of oil-in-water, pigment-in-oil with the pigment possessing very fine particle subdivision necessary for development of high opacity and gloss in the resulting film upon drying.

This new and novel method of manufacture of coatings requires only mixing equipment. Jacketed mixers are preferred because greater facility in manufacture results.

The term "oil" as used in this specification in general is employed as in emulsion technology, and refers to the non-water soluble part of an emulsion system, i.e., the "oil phase." Oil refers in particular to those natural and synthetic fluid organic water insoluble compounds commonly used as a whole or part of the vehicle or binder in coating compositions.

In describing the treated pigment, the term "oilophilic" is used because the more common term "hydrophobic" does not adequately describe the surface condition of the pigment after alteration. It is usual that all pigments altered to a more "oilophilic" or "oil-loving" surface than normally possessed by the pigment are "hydrophobic" or water repellent. However, it was found that if an unmodified glycero-phthalate resin, for example, was used to alter the surface of a pigment, it became "hydrophobic," but when used with a bodied drying oil, had little or no solubility in the oil selected as binder, and in this case the surface was not altered to an "oilophilic" nature and the requisite properties of gloss did not develop in the film, even though the pigment was hydrophobic. The term "oilophilic" is therefore used in a similar sense in reference to oil as the term "hydrophilic" is employed in relation to water, indicating a strong attraction between the pigment surface and the oil phase.

In the pigmented emulsions herein described, the pigments remain wetted by the oil phase, and because of the hydrophobic nature of their surfaces do not migrate beyond the water-oil interface. Emulsion paints containing such pigments will retain their ability to deposit glossy films despite package age.

The compounds used to render the pigments oilophilic for the purpose of the invention are monomeric organic compounds characterized by at least one non-polar organic hydrophobic group containing at least eight carbon atoms in a hydrocarbon structure which in the form of its monocarboxylic acid is soluble in oleoresinous varnishes and insoluble in water, and at least one polar group preferably selected from the class consisting of carboxylic acids, salts of said carboxylic acids, esters of said carboxylic acids and cationic ammonium and amine surface active groups containing an ionizable negative radical of a water soluble acid. Such polar groups are effective in causing said organic compounds to adhere to the pigment surface, especially where the latter are hydrophilic.

The preferred and most useful compounds employed to render pigments oilophilic for the purpose of the invention are polar organic compounds having the general formula:

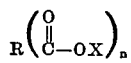

where R is a hydrophobic organic radical (e.g., hydrocarbon groups containing 8 to 36 carbon atoms such as $C_8$, $C_{10}$, $C_{12}$, $C_{14}$, $C_{16}$, $C_{18}$, $C_{19}$, hydrocarbon radicals), X is hydrogen, ammonium or metal salt forming group, and $n$ is a small whole number not greater than two and preferably one. Compounds within the scope of the above may be referred to as salts or soaps of detergent forming organic carboxylic acids. Also included are rosin and hydrogenated rosin, referred to herein as acid rosinates, and metal rosinate salts and soaps.

Included in this group are rosin acids, long chain fatty acids soluble in oleoresinous varnishes and insoluble in water, naphthenic acids and aromatic carboxylic acids and the salts and soaps of these acids. Specific metallic salts of the above acids effective for the purpose of the invention include lead, cobalt, manganese, zinc, nickel, sodium, copper, calcium, barium, magnesium, aluminum, etc. Repeated investigation has shown the aluminum salt to be preferred of the metal salts tested.

A second class of polar organic compounds useful for rendering the pigments oilophilic but more costly, are the water soluble cationic surface active ammonium and amine compounds characterized by a hydrophobic organic group and the negative radical of a water soluble acid bonded to the same nitrogen atom, the preferred compounds having a hydrocarbon chain containing 8 to 18 carbon atoms and an ionizable halogen atom bonded to a single nitrogen atom. Examples of such compounds are the long chain alkyl amine and ammonium addition products of halogen acids, the alkyl group being such that its monocarboxylic acid is soluble in oleoresinous varnishes and insoluble in water. Illustrative but not exclusive of the cationic surface agents useful for the purpose of the invention are lauryl pyridinium chloride, cetyl trimethyl ammonium bromide, stearamidoethyl pyridinium chloride, trimethyl heptadecyl ammonium chloride, triethylbenzyl ammonium chloride, stearyl triethyl ammonium bromide, octadecyl beta hydroxyethyl morpholinium bromide and the long chain alkyl trimethylammonium halides (sold under the trade name "Arquads" by Armour and Company) where the long chain alkyl group contains from 8 to 18 carbon atoms. Among the long chain alkyl amines useful in forming the salts of halogen acids are the octyl to octadecyl, octadecenyl and octadecadienyl amines (sold under the trade name of "Armeens" by Armour and Company).

A third class of polar organic compounds useful for surface treatment of pigments are the complex chromium compounds of the Werner type containing from one to about ten nuclear trivalent chromium atoms co-ordinated with acido groups, said acido groups as acids being soluble in oleoresinous varnishes and insoluble in water, the ratio of chromium atoms to acido groups within the range of from 1:1 to 10:1 within the co-ordination spheres of the chromium atoms and at least one halogen outside the co-ordination sphere but ionically associated with said co-ordination sphere. Suitable compounds of this class are described in U.S. Pats. 2,273,040, 2,544,667 and 2,544,668. The use of this specific class of materials for producing glossy pigment-in-oil, oil-in-water emulsions is covered in my U.S. Pat. 2,719,133, which was filed of even date with my application Ser. No. 230,841 of which the parent application Ser. No. 574,988 is a continuation-in-part.

A fourth class of suitable polar organic compounds includes the organic silicon halides wherein the organic radicals bonded to the silicon atom are soluble in the form of their monocarboxylic acids in oleoresinous varnishes and insoluble in water, and the halogen groups thereof are readily hydrolyzable when in contact with water. It can be seen that the residual monolayers of water in intimate contact with the pigment surface are suitable to form, through hydrolysis, a strong bond between the pigment surface and the oil soluble organic radical containing silicon upon intimate mixture of the "dry" pigment and the described silicon halides. If the organic silicon halide contains several reactive halogen atoms it may polymerize even in the presence of small amounts of moisture and to avoid this it is preferable to use an organic silicon monohalide. If the aforementioned polymerization occurs it interferes with subsequent reversion of the water-in-oil emulsion to an oil-in-water emulsion.

A polar compound is defined herein as one acting something akin to a length of chain with the properties of a bar magnet, one end of the chain having a "south pole" and the other a "north pole" nature, the "south pole" of the chain being attracted to and oriented upon a surface and the "north pole" effecting an interface with distinctive properties. In the instant case with the preferred polar compound, aluminum resinate, the metallic or "south pole" may be conceived of as being adsorbed and oriented on the pigment surface, and the oilophilic or "north pole" resinate as extending outwardly into the pigment air interface, and attracted strongly to oils.

The surface coating of the pigment with the selected agent may be effected by dry or wet methods. If the polar organic treating agent is water insoluble or water reactive, in the case of metallic salts of organic acids and hydrophobic silicon halides, a "dry" method as hereinafter described is preferred. If the surface coating agent is water soluble as in the case of the water soluble resinates, the quaternary ammonium salts, alkyl amine salts and the water soluble long chain organic Werner complexes, they are preferably added during the wet-grinding of the pigment in the final stages of its manufacture, but may also be added at the time the pigment is water-wetted in the initial stages of glossy emulsion paint manufacture. However, the pigment should be pre-coated with the oilophilic polar compound before emulsification. This pre-coating not only results in a final product which is glossy when dried but it also assists in the ease of formation of the first emulsion stage, i.e., the pigment-in-oil, water-in-oil emulsion.

Other methods of surface coating may be employed to accomplish the desired end, namely, the employment of an extremely fine dispersion of a titanium dioxide pigment, the surface of which is coated with a polar organic compound which renders said surface oilophilic and hydrophobic. The preferred method of surface treatment is by dry grinding of an admixture of pigment and agent, wherein from 0.5% to 4% of the treating agent coarsely mixed with the pigment is processed through a high speed super pulverizer (e.g., A Micronizer). About 1.5% of the surface treating agent is preferred in using this method. If the pigment is wet ground, about the same percentages of a water dispersible soap or salt of a modified rosin, or a solution in an organic solvent of a modified rosin may be added to and ground with the wet pigment slurry. After treating, if desired, the pigment may be dried and shipped to a point of use, or shipped with water present.

In the practice of the invention, the required amount of oilophilic pigment for the size batch planned is weighed into a jacketed mixing tank, and, if dry, the water necessary for the final water content can be added initially to the mixing tank before the pigment. After thorough mixing and dispersion of the oilophilic surfaced pigment in water, the desired oil is added slowly in a fine stream until between one-third and one-half of the total oil is stirred into the batch. A "cheesy" stage is often observed and thorough mixing at this point is desirable. The remainder of the oil is added and a phase inversion takes place wherein the water becomes the internal phase, the oil the external phase, and the pigment becomes extremely well dispersed in the now continuous oil phase. A considerable proportion of the water may break out, depending upon the system, and some remains as the internal or disperse phase of the mass. The water which separates can be removed at this point, if excessive. After the remaining oil has been added, the water content may be adjusted, if desired, at this point. It is preferable, however, to disperse the pigment in the amount of water required in the final emulsion paint composition so that adjustments in the water content at this stage are unnecessary.

Subsequently, and while mixing, an emulsifying agent, emulsion forming agents or combinations of emulsifying agents are added (mixtures of ionic and non-ionic types may be used) and another phase reversal normally takes place. The "oil" becomes the dispersed or internal phase carrying within it the oilophilic oil wetted, altered surfaced titanium dioxide pigment. This may be visualized as a concentric pattern of pigment with altered coating as a center (one or more pigment particles), surrounded by oil. The oil itself is in a finely divided form, emulsified in the water which is the continuous phase. As the size of the oil globules vary roughly between one-half micron and 10 microns, with the greatest percentage from 2 to 6 microns, the importance of extremely small pigment particle size is apparent, as theoretically the pigment should be totally wtihin the confines of the oil droplet. It is also desired that the smallest volume of pigment possible be used which will produce adequate hiding in the final paint product. So far as is known today, titanium dioxide is the only white pigment with the two necessary characteristics, i.e., extremely small particle size, and very high index of refraction (e.g., in excess of 2.4).

After the system has been sufficiently agitated to produce the emulsion system of pigment-in-oil, oil-in-water, a concentrated aqueous dispersion of a protective colloid is preferably added to stabilize the system in the final phase order. A solution of casein, a water soluble soap, or a water dispersible cellulose, such as methyl cellulose, may be employed, for example, depending upon the requirements of the product. In a glossy emulsion enamel, casein solutions may be chosen so that upon the surface or in the brush itself.

In case it is desired to use an emulsion elastomer as the binder portion of a glossy emulsion paint, the steps are varied only slightly as follows. To the altered surfaced oilophilic titanium dioxide dispersed in water is added a selected oily elastomer plasticizer with thorough mixing, and then the emulsifiers are added and the plasticizer pigment combination emulsified so that water is the continuous phase. The phase order is then preferably stabilized first with a protective colloid, and the emulsion elastomer added thereafter.

Emulsion elastomers include compounds of the class referred to as emulsion polymers or copolymers and contain the copolymers emulsified in an alkaline medium preferably, although with allowances and compensations made for pH, or hydrogen ion concentration on the acid side, acid type emulsion copolymers may also be utilized. Among the emulsion elastomers that may be utilized are emulsions of: styrene polymers, butadiene polymers, styrene and butadiene copolymerized, vinylidene and vinylidene chloride copolymerized, polyvinyl chloride, polyvinylacetate, alkyl methacrylate polymers, butadiene-acrylonitrile copolymers, and other elastomer emulsions known to the art.

To simplify the presentation of various examples of the preparation of emulsion coating compositions in accordance with the invention, the preparation of illustrative oil-resin vehicles and of a typical protein dispersion employed in the examples will first be described.

PREPARATION OF VEHICLE A 450 lbs. dehydrated castor fatty acids
84 lbs. pentaerythritol
27 lbs. glycerine, and
105 lbs. phthalic anhydride were weighed into a stainless steel kettle equipped with a cover and agitator, and a carbon dioxide blanket was maintained over the batch during the cook. The batch was heated to 370° F. in about 30 minutes and held one hour. The temperature was then increased to 460° F. and held for a body of $Z_1$–$Z_2$ (Gardner-Holdt), and the batch was then blown with carbon dioxide to an acid value of 10 or less.

PREPARATION OF VEHICLE B HIGHLY POLAR OIL 750 lbs. of varnish maker's linseed oil and
125 lbs. maleic anhydride were weighed into a stainless steel kettle and the batch taken to 365° F. and held for one hour. The temperature was then increased to 400° F., and the batch held for X–Y viscosity (Gardner-Holdt). It is preferred that a carbon dioxide blanket be maintained and that good agitation be employed.

EMULSIFIED OIL VEHICLE C

An emulsified varnish was prepared as follows:

1500 lbs. long oil alkyd varnish vehicle A
150 lbs. vehicle B
150 lbs. dehydrated castor oil fatty acids and
200 lbs. hydrogenated rosin (Staybelite)

were heated to 300° F. and the resin dissolved and allowed to cool to 210° F., then the following blend added:

40 lbs. 2-amino-2-methyl-1-propanol in 800 lbs. water emulsified with good agitation and formed into a soap, in situ, with the acids present. There was then added:

12 lbs. Advawet 32 concentrate (Advance Solvents, a non-ionic emulsifying agent), and
10 lbs. aqueous ammonia (commercial).

The pH of this product was about 8.4. This product was then ready for use in the examples which follow.

CASEIN SOLUTION D

To 3200 lbs. of warm water in a jacketed kettle was added 5 lbs. of octyl alcohol to prevent foam and 600 lbs. of acid precipitated casein, and the resultant mixture was soaked 10 minutes with good agitation.

Then 60 lbs. of preservative (e.g., Dowicides A and G and 30 lbs. of phenol) was added, the mixture was heated to 140 F., and then 75 lbs. of 10% caustic soda solution was added. The mixture was heated to 170° F. and held at this temperature for 15 minutes, and then 38 lbs. of 28% ammonium hydroxide was added. The dispersion had a pH of approximately 8.5.

The invention will now be further illustrated by the following examples of the preparation of emulsion enamels. In these examples, the values stated in terms of percent specular reflection represent a comparison with a standard black mirror giving 95% absolute specular reflection.

Example I (a) 400 lbs. water and
4 lbs. dispersing agent (Blancol)

were mixed in a paint mixer. 1000 lbs. of R-200 (duPont) titanium dioxide was treated with 1.5% aluminum resinate by "micronizing" the resinate and pigment together and was added to the water containing the dispersing agent, with good agitation, until the pigment was dispersed in the water. 640 lbs. of vehicle A, 12 lbs. of 6% cobalt naphthenate and 6 lbs. of 12% lead naphthenate were blended and added in a steady stream. The pigment was flushed into the oil phase giving a smooth paste having a ground appearance. A previously prepared blend of emulsifying agents, made by heating 30 lbs. of water to boiling along with 4¾ lbs. naphthenic acid and 21½ lbs. stearic acid, was formed into soap in situ by adding 5¼ lbs. 2-amino-2-methyl-1-propanol and 2 lbs. of a commercial aqueous ammonia. This soap emulsifying agent was added to the paint along with 15¼ lbs. of a non-ionic emulsifying agent such as Advawet 32 concentrate Advance Solvents). Following this addition, 640 lbs. of casein solution D was added with agitation. The phase changed upon addition of the emulsifying agents, and the casein stabilized the phase order. The pH of the product was adjusted to 8.5 with ammonia.

For use, the product was reduced about 50% with water, and when applied in two coats over a hard pressed board panel, the specular reflection of the product was substantially 32% at a 60° angle.

Example II (a) 400 lbs. water
4 lbs. dispersing agent, and
800 lbs. commercial TiO$_2$ (R-110 du Pont)

were weighed into a jacketed mixing tank and stirred until a uniform paste was produced. 80 lbs. of a 55% solution of a sodium soap of a hydrogenated rosin (Staybelite) in ethyl alcohol was added very slowly while the batch was under agitation. It is believed that a part of the soap was adsorbed and oriented on the surface of the untreated pigment and altered the surface character of the pigment. After thorough stirring (with heating if desired) 640 lbs. of varnish vehicle A was added with driers incorporated as in Example I. The batch was then completed as in Example I with the same quantity of the same addition agents. This product when reduced 50% with water and applied in two coats over a hard pressed board panel gave a gloss at 60° of 45% specular reflection.

(b) A formula similar to (a) was followed except that the rosin soap was omitted while employing the former amount of ethyl alcohol to maintain conditions otherwise the same. This formula, when reduced 50% and applied to a hard pressed board panel in two coats and allowed to dry, produced a specular reflection of approximately 12% when measured at an angle of 60°.

Example III

The procedure was carried out as in Example II, except that the 80 lbs. of 55% alcoholic soap solution used to treat the pigment was replaced with 40 lbs. of a 50% solution of a hydrogenated rosin (Staybelite) in xylene. 650 lbs. of varnish vehicle A in place of the 640 lbs. of Example II, was used and 750 lbs. of casein solution D was employed instead of the 640 lbs. This product was reduced 50% with water, applied in two coats over a hard pressed board panel, and gave a 60° reflection of 42% when dry.

Example IV

The procedure was carried out as in Example II, except the 80 lbs. of 55% rosin soap in alcohol was replaced with 150 lbs. of a 50% hydrogenated rosin soap (Staybelite soap) in water.

This product was reduced 50% with water and two coats over a hard pressed board panel produced a film having a specular reflection of 33% at a 60° angle.

Example V

The procedure was the same as Example I, except the rutile titanium pigment employed therein was treated with 1.5% by weight of aluminum naphthenate by "micronizing."

Example VI

The procedure was the same as Example I, except the rutile titanium dioxide employed therein was treated with 1.5% by weight of nickel naphthenate.

Example VII

The procedure was the same as Example I, except the rutile titanium dioxide was treated with 1% calcium resinate in mineral spirits solution and the slurry, dried and micropulverized before incorporation into the batch.

Example VIII

The procedure was the same as Example I, except the titanium dioxide pigment was rendered oilophilic and hydrophobic with cobalt naphthenate by ball milling the pigment in a light petroleum fraction in the presence of 1.5% by weight of the pigment of cobalt naphthenate for 24 hours and the excess solvent removed by centrifuging and the last traces thereof by exposure to the ambient atmosphere. Several days were allowed to elapse between the grinding and the centrifuging operation during which time the slurry was aged at about 120° F.

Example IX

The procedure was the same as Example I, except the titanium dioxide used therein was coated with 2% of stearic acid by "micronizing."

Example X

The procedure was the same as Example I, except the titanium dioxide pigment emloyed therein was surface coated to a hydrophobic, oilophilic nature by "micronizing" with 1% by weight of the pigment of wood rosin.

Example XI

The procedure was the same as Example I, except that titanium dioxide pigment therein used was surface coated with 1.5% by weight of aluminum stearate by the "micronizing" method.

Example XII

The procedure was the same as Example I, except the titanium dioxide pigment therein employed was surface coated with the sodium salt of rosin by "micronizing." Unusual dispersion activity was noted upon addition of this treated pigment to the Blancol-water mixture described. The effect resembled the addition of metallic sodium to water as the particles seemed literally to "skate" over the surface of the water.

Example XIII

A rutile titanium pigment was surface treated by "micronizing" it with aluminum octoate. A portion of the pigment batch so treated was thereafter incorporated as in Example I to produce a glossy emulsion enamel having a greater degree of specular reflection than the same pigment untreated and similarly incorporated.

Example XIV 1000 parts by weight of rutile titanium dioxide were heated at 225° F. for several days and placed in a crockery-type pebble mill. To the dry pigment was added 20 parts of octadecylsilicon trichloride (prepared as described in Example 3 of U.S. Pat. 2,413,050 issued to James Franklin Hyde, Dec. 24, 1946) which previously had been reflexed with two mols of nonyl alcohol per mol of octadecylsilicon trichloride and 2000 parts of freshly distilled mineral spirits. The pigment was milled for 24 hours, the excess solvent centrifuged off and the residual solvent removed by air-drying. The air-dried, treated pigment was then dispersed in water and made up into an emulsion paint as in Example I. The enamel film deposited therefrom had a greater specular reflectance than titanium dioxide pigment emulsion paints not so treated, but made otherwise the same.

Example XV

The procedure and quantities as described in Example II were followed with the exception that the 80 pounds of 55% solution of a sodium soap of hydrogenated rosin were substituted for with 64 pounds of a 25% solution of lauryl pyridinium chloride which was added in a similar manner to the rosin soap. The pigment slurry was heated to 200° F. and held for one hour and the varnish added and the batch completed as in Example II. The pigment treatment increased the resultant gloss of the final emulsion paint as compared with a blank not so treated.

Example XVI

The procedure was the same as Example XV, except 62 pounds of a solution of 33% concentration of octadecadienyl trimethyl amine chloride ("Arquad S" of Armour and Company) were used to replace the 64 pounds of lauryl pyridinium chloride solution.

Example XVII

The procedure was the same as Example XV, except 64 pounds of a 25% solution of octadecenylamine chloride (made from Armour's "Armeen" 18–D aliphatic amine containing 93% of the octadecenylamine and an equivalent amount of HCl) were used in place of the hydrogenated rosin soap of Example XV.

The resultant emulsion paint had superior gloss characteristics than formulas wherein the pigment surface was not altered by surface treatment with a polar organic compound.

Example XVIII 1200 parts by weight of titanium dioxide pigment were slurried in 3000 parts of distilled water in a pebble mill. 6 parts by weight of 36% HCl were added and the batch ground for 10 minutes to insure uniform dispersion of the additives. To the mixture was then added 18 parts of rosin amine ("Rosin Amine D" as furnished by the Naval Stores Division of Hercules Powder Company). The pigment and reactants were water-ground for 18 hours, and allowed to settle overnight. Excess water was removed by decantation and an equivalent amount of distilled water to that removed again added as a wash. After about ten minutes agitation on the pebble mill rack the pigment was dried by centrifuging out most of the water, and the water content of the wetted surface treated pigment adjusted to about 28% of the total.

1400 parts of the above paste were then transferred to a pony mixer pan and processed into an emulsion paint by the step of adding 640 parts of varnish vehicle and steps subsequent thereto as described in Example I.

The resulting emulsion paint gave films having a higher specular reflectance than pigments not treated with polar organic substances.

Example XIX 2400 parts of titanium dioxide pulp containing approximately 50% by weight of water, (the pulp obtained from a manufacturer of titanium pigments before the final drying step) were placed in a pebble mill and 1800 parts of distilled water were added to the pulp in addition. To this slurry were added 16 parts of an organic Werner-type chromium complex, prepared as described in U.S. Pat. 2,273,040, Example XI, after purification from methanol. This complex oleic acid-chromyl chloride reaction product was ground in the aqueous pigment slurry in the ball mill for 24 hours. After completion of this step, the batch was removed from the pebble mill and the excess water decanted after standing. The wet pigment concentrate was thereafter heated to 180° F. for 4 hours, washed with distilled water and centrifuged. The water content of the resultant pulp was readjusted to about 28% of the total pigment pulp and 1400 parts thereof were transferred to a pony mixer pan and processed into an emulsion paint following the procedure of adding 640 parts of varnish vehicle "A" plus driers as set forth in Example II and the remaining steps subsequent thereto as described in Example I.

The films deposited from the resultant emulsion paint had greater gloss than the standard wherein the pigment was not initially rendered oilophilic and hydrophobic by use of a polar organic compound having a non-polar group the monocarboxylic acid of which is soluble in oleoresinous vehicle and insoluble in water.

Example XX

A pulp titanium dioxide was treated as in Example XIX, but with a Werner-type organic chromium complex made in accordance with Example IV of U.S. Pat. 2,273,040. 25 parts of the stearato product obtained from methanol recrystallization were used in this case in lieu of the previous 16 parts. Other than the surface treatment medium and the amount, all other steps and quantities were identical with Example XIX.

Films of the emulsion enamel resulting had a gloss superior to a similar enamel wherein the surface of the titanium pigment had not been so treated.

Example XXI 200 lbs of water and
2 lbs. dispersing agent (Blancol)
were dissolved in a steam jacketed paint mixer and 500 lbs. of titanium dioxide pigment (duPont R–200) previously "Micronized" with 1½ of aluminum resinate was added with the whole being agitated until thoroughly dispersed in the water.

To this pigment slurry was added 400 lbs. of the previously prepared emulsified oil vehicle C into which 4 lbs. of 6% cobalt naphthenate and 2 lbs. of 12% lead naphthenate had been thoroughly stirred. 5 lbs. of 2-amino-2-methyl-1-propanol was then added, plus 6 lbs. of an anionic emulsifying agent of the sodium alkyl aryl sulfonate type (Nacconal N.R.S.F.). After thorough incorporation 12½ lbs. of a 25 centipoise type methyl cellulose was added with caution and dispersed therein.

This product was reduced 50% with water and produced a gloss in two coats over a hard pressed board panel of 50% specular reflectance at an angle of 60°. A product made with an untreated pigment over the identical formula in comparison produced a gloss of 34% specular reflectance at a 60° angle.

Example XXII 600 lbs. water
6 lbs. Blancol (dispersing agent)
820 lbs. titanium dioxide R–110 (untreated)

The above ingredients were stirred together in a steam jacketed agitator and thoroughly mixed.

280 lbs. vehicle B was added slowly with good agitation and after thoroughly treating the pigment and allowing a portion of the strongly polar oil to be adsorbed by the pigment the following ingredients were added under good agitation:

100 lbs. hydrogenated rosin (Staybelite) dissolved in 370 lbs. vehicle A.
8 lbs. 6% cobalt naphthenate
4 lbs. 12% lead naphthenate Afther thorough mixing the above composition was emulsified by the addition of:

4 lbs. 2-amino-2-methyl-1-propanol
6.5 lbs. aqueous ammonia (commercial —26%)

These basic ingredients formed an emulsified oil with the acidic groups of vehicle B. In this formulation vehicle B serves a quadruple function: (1) as surface treating agent, (2) as emulsifying agent, (3) as protective colloid, and (4) as part of the drying oil vehicle binder. To produce good brushing characteristics there was added finally:

20 lbs. ethylene glycol monomethylether (methyl Cellosolve)
10 lbs. diethylene glycol monoethylether (Carbitol)

These last named compounds extend the "wet edge" of the film in application.

The product, when reduced 25% with water and applied in two coats over hard pressed board panel, produced a gloss at a 60° angle of approximately 50% relative to a black mirror as standard at 95% specular reflection.

Example XXIII

This example illustrates the use of an emulsion copolymer.

200 lbs. titanium dioxide (duPont R–200) micronized with 1½% aluminum resinate and
200 lbs. water (cold, about 20° C.)

were well dispersed together in a mixer. After thorough mixing, 75 lbs. of tricresyl phosphate was added slowly to the pigment slurry.

2 pounds of 2-amino-2-methyl-1-propanol and 20 lbs. of a refined tall-oil were added and stirred thoroughly to emulsify the system. 5 lbs. of 25 centipoise type methyl cellulose was added as a thickener and stabilizer for the emulsion system. After the methyl cellulose had been incorporated, 400 lbs. of a styrene copolymer emulsion (e.g., Dow X–319 or X–579) was added. The copolymer emulsion contained about 50% solids.

This product can usually be applied without further reduction with water, and when applied in two coats over a hard pressed panel produced a specular reflection at 60° of approximately 40%. The same formulation made using the standard commercially available standard surfaced pigment as identified, under the same conditions, gave a gloss of about 5%, which is extremely low.

Example XXIV

While it is preferred to water wet the pigment initially because of the elimination of a grinding operation, the invention can be practiced in the following manner to produce emulsion enamels of increased gloss and gloss stability with age:

216 lbs. micronized $TiO_2$-R–200 containing 1½% aluminum resinate coating
133 lbs. vehicle A
2½ lbs. 6% cobalt naphthenate
1 lb. 12% lead naphthenate were flushed loosely through a 3-roller mill of the type used in grinding enamels. To this paste in a mixer was added 6½ lbs. of Advawet 32 concentrate (a non-ionic emulsifying agent) and 133 lbs. of prepared casein solution D. Then there was added a previously prepared emulsifying agent made by adding to 90 lbs. of boiling water, 1 lb. naphthenic acid 4½ lbs. stearic acid, and, when the stearic acid became liquid, 1 lb. 2-amino-2-methyl-1-propanol and 2 lbs. of commercial aqueous ammonia to form a soap or salt of the acidic materials.

When reduced 50% and applied in two coats over a hard pressed board panel, this paint produced a specular reflection of approximately 50% at an angle of 60°. The same formulation made with the pigment unaltered as to surface gave a gloss of approximately 15% when measured at the same angle.

In practice, both anatase and rutile type titanium dioxide pigments can be used. In those cases where specifications will permit, it is preferred to use a rutile type titanium dioxide as this pigment has a higher hiding capacity for a given volume of pigment than the anatase form. It will be noted that some pigments now commercially available will produce more glossy films than others in standard formulations. It is believed that these pigments inherently possess a mineral type surface of nature more oilophilic than those producing less gloss. However, it is to be noted that even though this be true, by efficient coating of the most attractive titanium dioxide pigment commercially available, for example, by Micronizing the pigment and a small percentage of aluminum resinate, the gloss which has been produced in a given formula has been found to be improved thereby, both initially, and when measured after age in the package.

Other types and modifications of vehicles than those illustrated can also be employed and the proportions of pigment to vehicle can be changed. There are a wide variety of emulsifying agents from which one may select and achieve excellent results. Protective colloids for stabilization of phase relationships which may be mentioned are natural occurring gums, casein, water dispersible modified celluloses, and soaps derived from a wide variety of high molecular weigth acidic organic compounds.

As previously indicated, the quantity of water employed in the treatment of the pigment in the stage where the pigment is made oilophilic should be sufficient to coat the pigment and leave a boundary of water between adjacent particles which will serve to penetrate and isolate the pigment particles. The amount of water therefore will depend to some extent upon the surface area of the pigment, but in general a considerable excess over the amount necessary to cover the surface area of the pigment is preferred. The minimum amount may be about 15% to 20% by weight of the pigment, while the practical maximum amount will be the amount ultimately desired to be present in the final emulsion. Usually this latter amount will not exceed a ratio of water to pigment of about 2:1. The quantity of water initially employed is preferably such that excess water does not break out when the oilophilic pigment is dispersed with a part of the oil to form the water-in-oil, pigment-in-oil dispersion during the first noted phase change. If the quantity of water is in excess, and water does break out at this latter stage, it can be poured off, but as this is unnecessary waste motion such operations should be avoided.

The quantity of water present in the composition after the final phase change, that is, after the conversion to the oil-in-water emulsion, will usually be within the range of 30% to 65% water by weight, and the quantity of pigment will usually be within the range of 15% to 45% pigment by weight. The final product has a pasty appearance, and a consistency such that the paste can be readily reduced by additions of water with stirring. The water, pigment and oil will account for approximately 95% of the total weight of the completed emulsion enamel.

The pasty product is reduced by the consumer by adding more water, and usually this water reduction will involve the addition of half as much water as paste used, which, according to the custom of the trade, is referred to as a 50% reduction. It is possible, of course, to add more water before packaging and thereby to reduce the consistency and produce a less concentrated product.

The invention is not limited to the choice of any particular resin or salt of a resin for rendering the pigment oilophilic except that the surface treating agent as already explained, should be oilophilic and preferably one containing a polar group.

The invention is also not limited to the use of any particular dispersing agent, or to the use of dispersing agents in general. While theory indicates that a dispersing agent is desirable, no difference in results has been detectable when the use of dispersing agents was omitted entirely.

The term "binder" used herein refers to the amorphous water insoluble resinous material, or organic polymer, which serves as the major portion of the non-volatile vehicle solids.

With respect to the pigment employed, it may be pointed out that any pigment, white or colored, having a particle size small enough to be encompassed by the oil droplets might be used. Although titanium dioxide has been employed principally in the practice of the invention, the invention is also applicable to other pigments having the general characteristics mentioned, including, for example, zinc sulfide, upon proper surface alteration.

The term "Staybelite" is a trade name for hydrogenated rosin (Hercules Powder Company).

The term "micronized" refers to a process of pigment dispersion wherein the pigment is aspirated into a gas moving at high velocity in an inverted dishpan-like apparatus such that the high velocity and rubbing of the pigment particles against each other reduces the particle size. There are other methods similar in principle that may be used for coating the pigment.

The term "Blancol" (Antara Chemicals Division, General Dyestuff) is a trade name for a resinous water soluble agent which has a dispersing effect without any substantial effect on surface tension.

The term "Advawet 32" (Advance Solvents and Chemical Corporation) is a trade name for a non-ionic ethylene oxide condensation product of a pentaerythritol esterified with a long chain fatty acid.

The terms "Dowicide A" and "Dowicide G" (Dow Chemical Company) are trade names for sodium orthophenylphenate and the sodium salt of pentachlorophenol.

The expression "water treated oilophilic pigment" is employed herein to describe a pigment which has been surface treated to render it oilophilic and has been dispersed in water prior to dispersing it in oil.

The term "glossy" as herein used is a relative term, conveying a meaning opposed to flat or diffuse. A more technically correct expression is the phrase "high specular reflection" in lieu of "glossy." "Specular reflection" refers to that quality of light as reflected from a black mirror. In fact, by the percent of gloss or specular reflection is meant that amount of light, reflected at a given angle from a surface, as compared with a standard black glass mirror taken as specularly reflecting 95% of all the light incident upon it. The standard angle of reference has commonly been a 60° angle. Surfaces reflecting less than 10% are dead flat for all practical purposes. As the specular reflection increases to 20% there is an increasing angular sheen, a type of gloss noted when the observer receives light as from the side walls in a long narrow hallway. Gloss observable at acute angles to the surface is called sheen. Glossy emulsion coatings can be made with high angular sheens and yet be practically flat when observed at an angle of 60 to 90°.

The compositions of this invention may be made from high sheen types to those possessing glosses of over 80% at an angle of 60°. Higher gloss emulsion materials can be produced by the method herein disclosed than were heretofore possible with standard pigments with comparative formulation.

It is to be understood in the description of the gloss obtained in the above illustrations that there are many factors which will influence the gloss, such as the number of coats applied, the ratio of pigment to vehicle solids, the viscosity of the reduced emulsion paint, the type of brush, the porosity of the surface over which the enamel is applied, the skill of the operator and other factors apparent to one experienced in the formulation of paints. Therefore, the figures given for specular reflectance in each case are subject to some fluctuation, depending upon many factors, and the examples given are illustrative of the comparative results which have been achieved, and show the improvement that may be anticipated in practice.

Glossy emulsion coatings as prepared herein are suitable for a wide variety of trade sales products, road marking paints, specialties and industrial finishes and possess as inherent advantages (1) the use of water as a diluent replacing solvents, (2) reduction to a minimum of fire hazards in storage, and (3) practically odor-free application. Because of their high hiding qualities and their lack of penetration, fewer coats are required than with conventional enamels. These characteristics increase the economy of use and open a new approach to problems of decoration.

As will be apparent to those skilled in the art, many colors available for architectural decoration are made from white bases. There are relatively few colors used as such, or by themselves. Some notable exceptions are blacks and some reds. The procedure is to tint or shade a white base with the selected shading colors ground in a suitable oil or varnish. A similar procedure may be followed in the glossy, emulsion enamels herein proposed. The white enamels produced may be used as bases, and tinted or shaded by use of colored pigments, either ground into the proper vehicle or made into shading bases by surface treatment and the method herein disclosed. While not necessary because of the small amount used, it is preferred that the colored pigments be surface coated to a standard oilophilic surface prior to production of the shading bases, assuring more color uniformity. Because of the color phenomena of emulsions themselves, colors must be matched after they have partially dried to eliminate the milky effect upon the color of the emulsified system.

The invention is hereby claimed as follows:

1. An oil-in-water emulsion coating composition comprising essentially a discontinuous water-immiscible liquid phase containing a pigment which is surface coated with a compound effective to render said pigment oilophilic from the group consisting of rosin, rosin esters, hydrogenated rosin, salts of hydrogenated roson and salts of rosin, and a water-immiscible liquid vehicle capable of forming a film when dried, and a continuous aqueous phase.

2. An oil-in-water emulsion coating composition comprising essentially a discontinuous water-immiscible liquid phase containing a pigment which is surface coated with a compound effective to render said pigment oilophilic from the group consisting of rosin, rosin esters, hydroenated rosin, salts of hydrogenated rosin and salts of rosin and a water-immiscible liquid vehicle capable of forming a film when dried, and a continuous aqueous phase containing a protective colloid.

3. An oil-in-water emulsion coating composition comprising essentially a discontinuous water-immiscible liquid phase containing a pigment which is surface coated with a compound effective to render said pigment oilophilic from the group consisting of rosin, rosin esters, hydrogenated rosin, salts of hydrogenated rosin and salts of rosin and a water-immiscible liquid vehicle capable of forming a film when dried, and a continuous aqueous phase containing casein.

4. An oil-in-water emulsion coating composition comprising essentially a discontinuous water-immiscible liquid phase containing a water-immiscible liquid vehicle capable of forming a film when dried and a titanium dioxide pigment of which the surface is precoated with hydrogenated rosin and a continuous aqueous phase.

5. An oil-in-water emulsion coating composition comprising essentially a discontinuous water-immiscible liquid phase containing a water-immiscible liquid vehicle capable of forming a film when dried and a titanium dioxide pigment of which the surface is coated with a metal salt of hydrogenated rosin, and continuous aqueous phase.

6. An oil-in-water emulsion coating composition comprising essentially a discontinuous water-immiscible liquid phase containing a water-immiscible liquid vehicle capable of forming a film when dried and a titanium dioxide pigment of which the surface is coated with aluminum resinate, and a continuous aqueous phase.

7. An oil-in-water emulsion coating composition comprising essentially a discontinuous water-immiscible liquid phase containing a water-immiscible liquid vehicle capable of forming a film when dried and a titanium dioxide pigment of which the surface is precoated with rosin, and a continuous aqueous phase.

8. An oil-in-water emulsion coating composition comprising essentially a discontinuous water-immiscible liquid vehicle capable of forming a film when dried and a titanium dioxide pigment of which the surface is precoated with a rosin ester, and a continuous aqueous phase.

9. An oil-in-water emulsion coating composition comprising essentially a discontinuous water-immiscible liquid phase containing a water-immiscible liquid vehicle capable of forming a film when dried and a titanium dioxide pigment of which the surface is coated with a salt of rosin, and a continuous aqueous phase.

10. The process of producing a glossy oil-in-water pigment-in-oil coating composition which comprises dry milling a titanium dioxide pigment in a fluid energy mill with surface coating quantities of aluminum resinate effective permanently to render said pigment both hydrophobic and oilophilic, dispersing said treated pigment in water, adding to said aqueous dispersion while stirring a water-immiscible liquid vehicle capable of forming a film when dried, transferring said pigment to the water-immiscible vehicle phase, and through reversal of the emulsion phase relationship, emulsifying the resultant product to an oil-in-water, pigment-in-oil emulsion.

11. A process of preparing an emulsion coating composition comprising essentially a continuous aqueous phase and a discontinuous water insoluble oil phase containing a pigment dispersed in said discontinuous phase which comprises surface coating a pigment with aluminum resinate, in sufficient amount to render said pigment oilophilic and adding water to said pigment, thereafter adding an oil phase and emulsifying said surface-coated pigment with an oily elastomer plasticizer to form a water-in-oil, pigment-in-oil emulsion, adding an emulsifying agent to convert said water-in-oil, pigment-in-oil emulsion to a pigment-in-oil, oil-in-water emulsion and adding an emulsion elastomer to said last named emulsion, said aluminum resinate adhering to said pigment surface when said coated pigment is emulsified, said coating of aluminate resinate having been applied to said pigment prior to emulsification thereof, and prior to dispersion of said pigment in said oil phase and said discontinuous pigmented phase being capable of forming a continuous solid glossy film when dried.

References Cited
UNITED STATES PATENTS

| | | | |
|---|---|---|---|
| 1,946,054 | 2/1934 | Baldwin | 106—308 |
| 2,274,521 | 2/1942 | Berry | 106—308 F |
| 2,290,914 | 7/1942 | Machlin | 106—308 F |
| 2,440,953 | 5/1948 | Iliff et al. | 260—29.2 |

WILBERT J. BRIGGS, Sr., Primary Examiner

U.S. Cl. X.R.

106—143, 144, 148, 222, 228, 248, 262, 266, 308 F, 308 Q; 260—7.5, 8, 22 T, 23 R, 23 XA, 23 S, 23.7 R, 23.7 A, 26, 27 R, 27 BB, 29.2 E, 29.6 MM, 29.6 R, 29.6 PM, 29.7 M, 29.7 EM, 29.7 R

UNITED STATES PATENT OFFICE
CERTIFICATE OF CORRECTION

Patent No. 3,775,360          Dated November 27, 1973

Inventor(s) RICHARD GLENN SMITH

It is certified that error appears in the above-identified patent and that said Letters Patent are hereby corrected as shown below:

Column 2, line 6, after "continuous" insert --water insoluble oil phase containing dispersed in said discontinuous--.

Column 6, line 18, after "upon" insert --application with a brush the emulsion will not "break" upon--.

Column 7, line 60, before "Advance" insert --(--.

Column 11, line 1, after "1-1/2" insert --%--.

Column 12, line 63, change "weigth" to --weight--.

Column 15, line 2, change "roson" to --resin--.

Signed and sealed this 17th day of December 1974.

(SEAL)
Attest:

McCOY M. GIBSON JR.          C. MARSHALL DANN
Attesting Officer             Commissioner of Patents